(12) United States Patent
Moore (10) Patent No.: US 10,674,666 B2
(45) Date of Patent: Jun. 9, 2020

(54) END EFFECTORS FOR HARVESTING MACHINES AND METHODS FOR USING END EFFECTORS

(71) Applicant: HarvestMoore, L.L.C., Pasco, WA (US)

(72) Inventor: Francis Wilson Moore, Pasco, WA (US)

(73) Assignee: HarvestMoore, L.L.C., Pasco, WA (US)

( * ) Notice: Subject to any disclaimer, the term of this patent is extended or adjusted under 35 U.S.C. 154(b) by 204 days.

(21) Appl. No.: 15/982,512

(22) Filed: May 17, 2018

(65) Prior Publication Data

US 2018/0332770 A1 Nov. 22, 2018

Related U.S. Application Data

(60) Provisional application No. 62/508,009, filed on May 18, 2017.

(51) Int. Cl.
*A01D 46/00* (2006.01)
*A01D 46/26* (2006.01)

(52) U.S. Cl.
CPC ......... *A01D 46/264* (2013.01); *A01D 46/005* (2013.01); *A01D 2046/268* (2013.01)

(58) Field of Classification Search
CPC .... A01D 46/264; A01D 46/005; A01D 46/26; A01D 46/30; A01D 2046/268; A01D 2046/266
See application file for complete search history.

(56) References Cited

U.S. PATENT DOCUMENTS

| | | | |
|---|---|---|---|
| 2,288,682 A | | 7/1942 | Chittenden |
| 2,443,027 A | | 6/1948 | Dishmaker |
| 2,553,463 A | | 5/1951 | McCulloch |
| 2,968,907 A | | 1/1961 | Bernheim |
| 3,165,833 A | | 1/1965 | Logan |
| 3,165,880 A | | 1/1965 | Buie |
| 3,182,827 A | | 5/1965 | Frost |
| 3,277,572 A | | 10/1966 | Eickenberg |
| 3,365,870 A | | 1/1968 | Cardinale |
| 3,389,543 A | * | 6/1968 | Clark ................... A01D 46/253 56/337 |
| 3,401,514 A | * | 9/1968 | Clark ..................... A01D 46/24 56/328.1 |
| 3,460,327 A | * | 8/1969 | Johnson ............... A01D 46/005 56/328.1 |

(Continued)

FOREIGN PATENT DOCUMENTS

EP 0267860 A2 5/1988
WO WO 4/2011
PCT/US2010/046678

OTHER PUBLICATIONS

Gorte, et al., "Structuring Laser-Scanned Trees Using 3D Mathematical Morphology", ResearchGate Conference Paper, Jan. 2004, 6 pgs.

*Primary Examiner* — Robert E Pezzuto
*Assistant Examiner* — Adam J Behrens
(74) *Attorney, Agent, or Firm* — Wells St. John P.S.

(57) ABSTRACT

An end effector for harvesting fruit. The end effector has a housing and a plurality of tangs extending from an end of the housing. The end effector further has an oscillator device secured to the housing and the oscillator device in an oscillating relationship with the plurality of tangs.

16 Claims, 10 Drawing Sheets

(56) References Cited

U.S. PATENT DOCUMENTS

| | | |
|---|---|---|
| 3,460,328 A | 8/1969 | Lee |
| 3,460,330 A | 8/1969 | Black |
| 3,507,107 A | 4/1970 | Harms |
| 3,561,205 A * | 2/1971 | Pitti ............... A01D 46/24 56/328.1 |
| 3,564,826 A | 2/1971 | Middleton, Jr. |
| 3,591,949 A * | 7/1971 | Connery ............ A01D 46/005 56/332 |
| 3,596,456 A * | 8/1971 | Quick ............ A01D 46/00 56/330 |
| 3,621,643 A | 11/1971 | Garrans |
| 3,651,627 A * | 3/1972 | Pitti ............ A01D 46/264 56/328.1 |
| 3,690,053 A * | 9/1972 | Thorn ............ A01D 46/005 56/328.1 |
| 3,713,282 A * | 1/1973 | Baker ............ A01D 46/24 56/328.1 |
| 3,756,001 A | 9/1973 | Macidull |
| 3,793,814 A | 2/1974 | Rohrbach |
| 3,898,785 A | 8/1975 | Chew |
| 3,913,307 A | 10/1975 | Cardinal, Jr. |
| 3,969,878 A | 7/1976 | Morganeier |
| 4,015,366 A | 4/1977 | Hall, III |
| 4,215,451 A | 8/1980 | Wikoff |
| 4,482,960 A | 11/1984 | Pryor |
| 4,501,113 A | 2/1985 | Gerber |
| 4,507,579 A | 3/1985 | Turner |
| 4,519,193 A | 5/1985 | Yoshida |
| 4,520,619 A | 6/1985 | Doi |
| 4,532,757 A | 8/1985 | Tuue |
| 4,606,179 A | 8/1986 | Peterson |
| 4,611,461 A * | 9/1986 | Tyros ............ A01D 46/253 56/10.5 |
| 4,663,925 A | 5/1987 | Terada |
| 4,718,223 A | 1/1988 | Suzuki |
| 4,769,700 A | 9/1988 | Pryor |
| 4,860,529 A | 8/1989 | Peterson |
| 4,975,016 A | 12/1990 | Pellenc |
| 4,976,094 A | 12/1990 | Williamson |
| 5,005,347 A | 4/1991 | Kedem |
| 5,280,697 A | 1/1994 | Miller |
| 5,426,927 A | 6/1995 | Wang |
| 5,471,827 A | 12/1995 | Janssen |
| 5,816,037 A | 10/1998 | Chiel |
| 5,946,896 A * | 9/1999 | Daniels ............ A01D 46/264 56/328.1 |
| 6,250,056 B1 | 6/2001 | Spagnolo |
| 6,425,233 B1 * | 7/2002 | Hosking ............ A01D 46/264 56/11.9 |
| 6,442,920 B1 | 9/2002 | Peterson |
| 6,553,299 B1 | 4/2003 | Keller |
| 6,591,591 B2 | 7/2003 | Coers |
| 6,671,582 B1 | 12/2003 | Hanley |
| 7,204,072 B2 | 4/2007 | Joy et al. |
| 7,418,985 B2 | 9/2008 | Torgersen |
| 7,487,809 B2 | 2/2009 | Uebergang |
| 7,500,343 B2 | 3/2009 | Hsia |
| 7,540,137 B2 | 6/2009 | Gray |
| 7,640,091 B2 | 12/2009 | Berg |
| 7,765,780 B2 | 8/2010 | Koselka |
| 7,810,305 B2 | 10/2010 | Macidull |
| 8,381,501 B2 | 2/2013 | Koselka et al. |
| 8,442,304 B2 | 5/2013 | Marrion et al. |
| 8,938,941 B2 * | 1/2015 | Minelli ............ A01D 46/264 56/332 |
| 9,357,708 B2 * | 6/2016 | Chang ............ A01D 46/26 |
| 9,439,354 B2 * | 9/2016 | Minelli ............ A01D 46/264 |
| 2002/0062635 A1 * | 5/2002 | Hosking ............ A01D 46/264 56/340.1 |
| 2005/0039431 A1 | 2/2005 | Schloesser |
| 2005/0126144 A1 | 6/2005 | Koselka |
| 2006/0026940 A1 | 2/2006 | Cartner |
| 2006/0150602 A1 | 7/2006 | Stimmann |
| 2006/0213167 A1 | 9/2006 | Koselka et al. |
| 2008/0010961 A1 | 1/2008 | Gray |
| 2008/0264030 A1 | 10/2008 | Bryan |
| 2008/0279460 A1 | 11/2008 | Kasahara |
| 2009/0293442 A1 * | 12/2009 | Chang ............ A01D 46/26 56/328.1 |
| 2010/0212279 A1 | 8/2010 | Macidull |
| 2011/0022231 A1 | 1/2011 | Walker |
| 2014/0283495 A1 | 9/2014 | Christensen |
| 2016/0057940 A1 | 3/2016 | Lyons |

* cited by examiner

END EFFECTORS FOR HARVESTING MACHINES AND METHODS FOR USING END EFFECTORS

CROSS REFERENCE TO RELATED APPLICATION

This application claims benefit of U.S. Provisional Patent Application No. 62/508,009 filed on May 18, 2017.

TECHNICAL FIELD

The subject of this application relates to end effectors for harvesting machines and methods of using same.

BACKGROUND OF THE DISCLOSURE

Current machine harvesters for fruit such as berries employ a shaking method to harvest the berries. That is, the machine harvesters have shaking systems that violently shake the berry bushes with enough force and energy to dislodge (release) the berries from their stems. In fact, the shaking is so violent that immature berries are dislodged from their stems. However, these current harvesting methods and systems of machines damage the berries so extensively that the quality of the berries will not suffice for use in the fresh commercial market. Accordingly, berries currently harvested by a machine are commercially processed into the less desirable and less profitable jellies, jams and other products that do not require fresh berries.

There is a need for harvester systems and methods that will allow for the harvesting of berries with a machine while maintaining the quality of the berries for the fresh commercial market. Still further, there is a need for harvester systems and methods that will allow for the harvesting of different sized berries with a machine and separating the different sized berries.

BRIEF DESCRIPTION OF THE DRAWINGS

Exemplary embodiments of the various disclosures are described below with reference to the following accompanying drawings.

DETAILED DESCRIPTION OF THE EMBODIMENTS

This disclosure is submitted in furtherance of the constitutional purposes of the U.S. Patent Laws "to promote the progress of science and useful arts" (Article 1, Section 8).

The harvester systems and methods of this invention allow for the harvesting of fruit such as berries with a machine while maintaining the quality of the berries for the fresh commercial market. Still further, harvester systems and methods of this invention allow for the harvesting of different sized berries with a machine and separating the different sized berries. The harvester systems and methods of this invention will meet the standards for commercial fresh-market requirements and will not require the hand picking of the fruit.

The harvester systems and methods of this invention can be used for harvesting blackberries, raspberries, strawberries, huckleberries, and other bush grown berries and meet the standards and requirements for the commercial fresh berry market.

Figure 1:
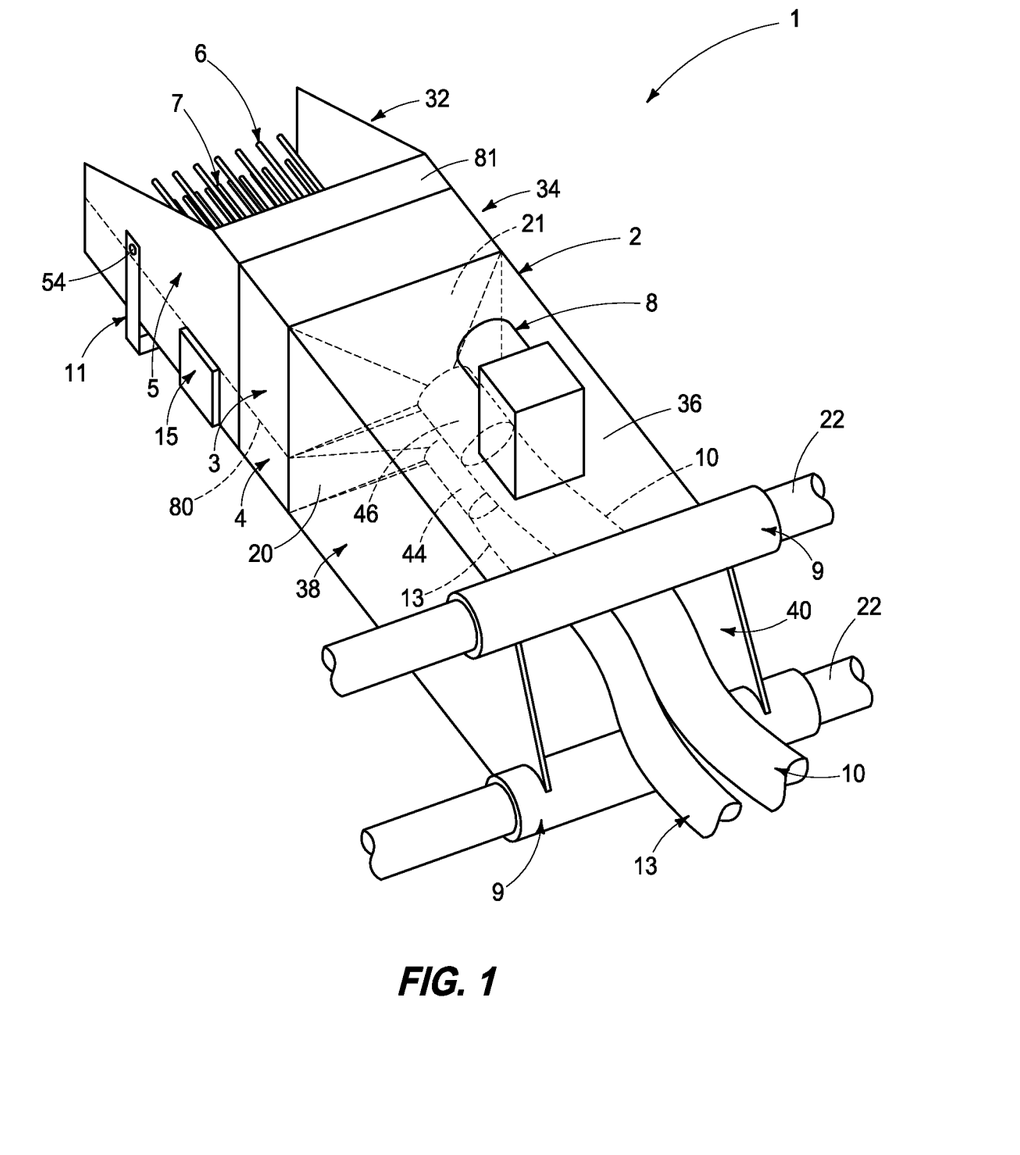
FIG. 1 is a perspective view of an exemplary end effector according to an embodiment of the invention.

Referring to FIG. 1, an exemplary end effector 1 is illustrated according to one embodiment of the invention. The end effector 1 has a housing that includes a front section 32 secured to an intermediate section 34 and the intermediate section 34 secured to a rear section 2. The rear section 2 has a top surface 36 and two side walls 38 extending from opposite edges of the top surface 36 (downwardly in this view). Each side wall 38 and top surface 36 are generally planar structures. The top surface 36 supports a camera 8. Each side wall 38 is oriented generally parallel to each other leaving the bottom region of the rear section 2 open to the environment. Each side wall 38 and top surface 36 extend rearwardly from the intermediate section 34 and terminate opposite the intermediate section 34. The rearmost portion of the rear section 2 has a pair of sleeves 9 that are vertically spaced (upper and lower sleeves 9). Each sleeve 9 extends from one side wall 38 to the other side wall 38 generally perpendicularly to the length dimension of the end effector 1. An opening 40 is established (or defined) at the rearmost portion of the rear section 2 between the sleeves 9 and edges of the side walls 38.

Still referring to FIG. 1, the frontmost portion of rear section 2 (adjacent the intermediate section 34) includes an upper funnel structure (first collection device) 21 having a mouth in fluid communication with an upper chamber 3 of the intermediate section 34. A stem of the upper funnel structure 21 is secured to an end of a first conduit 10 (hose or tube) via a coupler 46. The first conduit 10 exits the opening 40 and is ultimately coupled to a machine such as a harvester (harvesting machine not shown). The rear section 2 further includes a lower funnel structure (second collection device) 20 immediately below the upper funnel structure 21. The lower funnel structure 20 has a mouth in fluid communication with a lower chamber 4 (immediately below the upper chamber 3) of the intermediate section 34. A stem of the lower funnel structure 20 is secured to an end of a second conduit 13 (hose or tube) via a coupler 44. The second conduit 13 exits the opening 40 of rear section 2 and is ultimately coupled to a machine such as a harvester (harvesting machine). The first conduit 10 has a larger diameter than the second conduit 13.

It should be understood that the upper funnel structure 21 and the first conduit 10 are configured to receive berries having larger dimensions than those received by the lower funnel structure 20 and the second conduit 13. It should be further understood that a vacuum will be provided through the upper funnel structure 21 and through the first conduit 10. Similarly, a vacuum will be provided through the lower funnel structure 20 and through the second conduit 13.

It was previously stated that the bottom area of the rear section 2 is open to the environment. However, alternatively, a planar structure may extend between one or more of the intermediate section 34, the side walls 38, and the lower sleeve 9 to completely, or partially, enclose the bottom area of the rear section 2. In fact, the housing of the end effector 1 can be a structure that encloses all sections and parts except for the front section 32 having tangs 6 and 7 (introduced and described below) wherein the first and second conduits 10/13 can extend through sealed openings.

It should be understood that a pivot pin 22 (or axle) will extend through each sleeve 9. The pivot pins 22 couple (or secure) the end effector 1 to another machine, such as the harvesting machine (harvester, not shown), in a pivoting relationship. This configuration of pivot pins 22 will allow the end effector 1 to pivot on an imaginary axis oriented generally perpendicularly to the length dimension of end effector 1. It should be understood other pivot configurations could be provided, for example, a single pivot pin provided in a single sleeve. Alternatively, a single ball pivot could be secured to one of the side walls 38 of rear section 2 and would allow for a pivoting action of the end effector 1 on each of the three axes of three-dimensional space.

Figure 2:
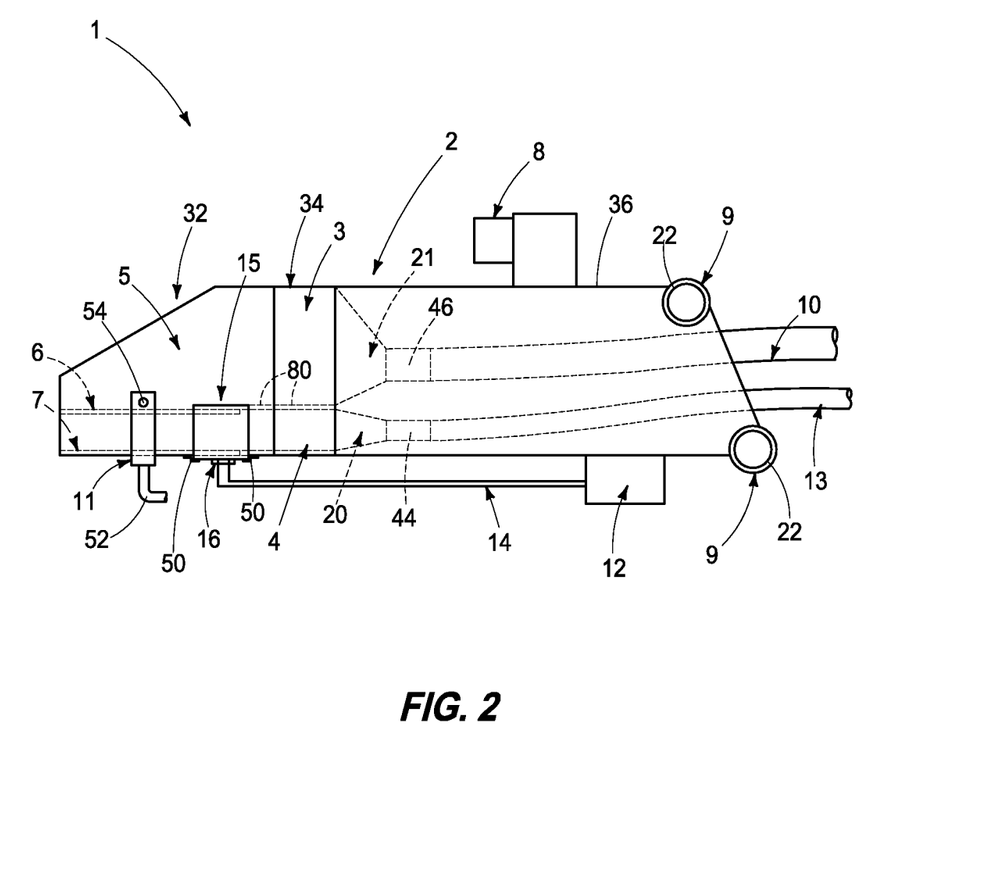
FIG. 2 is a side view of the end effector of FIG. 1.

Still referring to FIG. 1, the upper and lower chambers 3 and 4 of intermediate section 34 are separated by a planar divider surface 80 which extends partially into the front section 32 (see FIG. 2). Accordingly, the entire intermediate section 34 structure establishes the two openings: the upper and lower chambers 3 and 4, respectively. Effectively, the intermediate section 34 provides fluid communication between the front section 32 and the first and second conduits 10 and 13, respectively (through the upper and lower funnel structures 21 and 20, respectively).

Still referring to FIG. 1, the front section 32 has two planar side walls 5 spaced from each other, parallel to each other, and extending from intermediate section 34 in a coplanar relationship with the sides (side walls) of intermediate section 34. The front section 32 is open to the environment at the bottom and top regions and includes only a small top surface 81 extending between opposites side walls 5. A tang cartridge 15 (hereinafter referred to as "cartridge" for simplicity) is removably secured in the front section 32 and described more thoroughly subsequently. A manifold 11 is secured to the side walls 5 of front section 32 via attachment 54 and described more thoroughly subsequently. A plurality of tangs 6 and 7 (or prongs) are secured to the cartridge 15 and described more thoroughly subsequently. The tangs 6 and 7 extend between the opposites side walls 5 in generally a parallel relationship with the each other. Collectively, tangs 6/7 can be characterized as a rake. It should be understood that tangs 6/7 are a long and slender projecting strip, tongue, or prong.

Referring to FIG. 2, manifold 11 includes a conduit 52 (or hose, tube) to receive a fluid from a fluid source. An exemplary fluid is any gas such as air, and for other embodiments, an exemplary fluid is any liquid such as water. One end of an oscillating arm 14 (vibrating arm) is secured to the cartridge 15 via a coupler 16. In one embodiment of the invention, the coupler 16 is a pivot connection with the one end of an oscillating arm 14 pivotally secured to the cartridge 15. In another embodiment of the invention, the coupler 16 is a non-pivot connection with the one end of an oscillating arm 14 secured, but not pivotally secured, to the cartridge 15. An opposite end of the oscillating arm 14 extends from an oscillator 12 (vibrator) enclosed in a housing and described more thoroughly subsequently.

Figure 3:
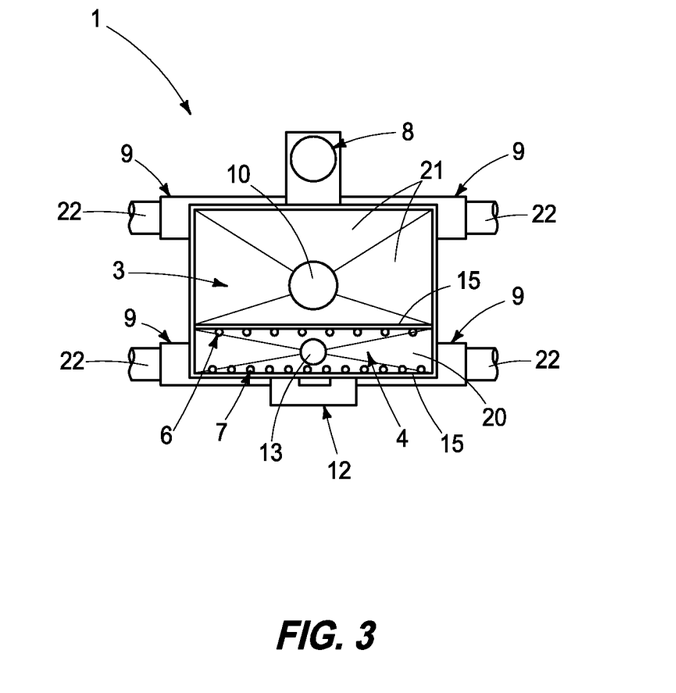
FIG. 3 is a front-end view of the end effector of FIG. 1.

Referring to FIG. 3, and from this view of the front of the end effector 1, an upper elevation of a line of sight extends through the front and intermediate sections 32 and 34 to the upper funnel structure 21 and first conduit 10. Accordingly, as suggested previously, the upper chamber 3 is defined by, or through, the intermediate section 34 and by, or through, the front section 32. Similarly, a lower elevation of a line of sight extends through the front and intermediate sections 32 and 34 (through the cartridge 15 between tangs 6 and 7) to the lower funnel structure 20 and second conduit 13. Accordingly, as suggested previously, the lower chamber 4 is defined by, or through, the intermediate section 34 and by, or through, the front section 32.

Figure 4:
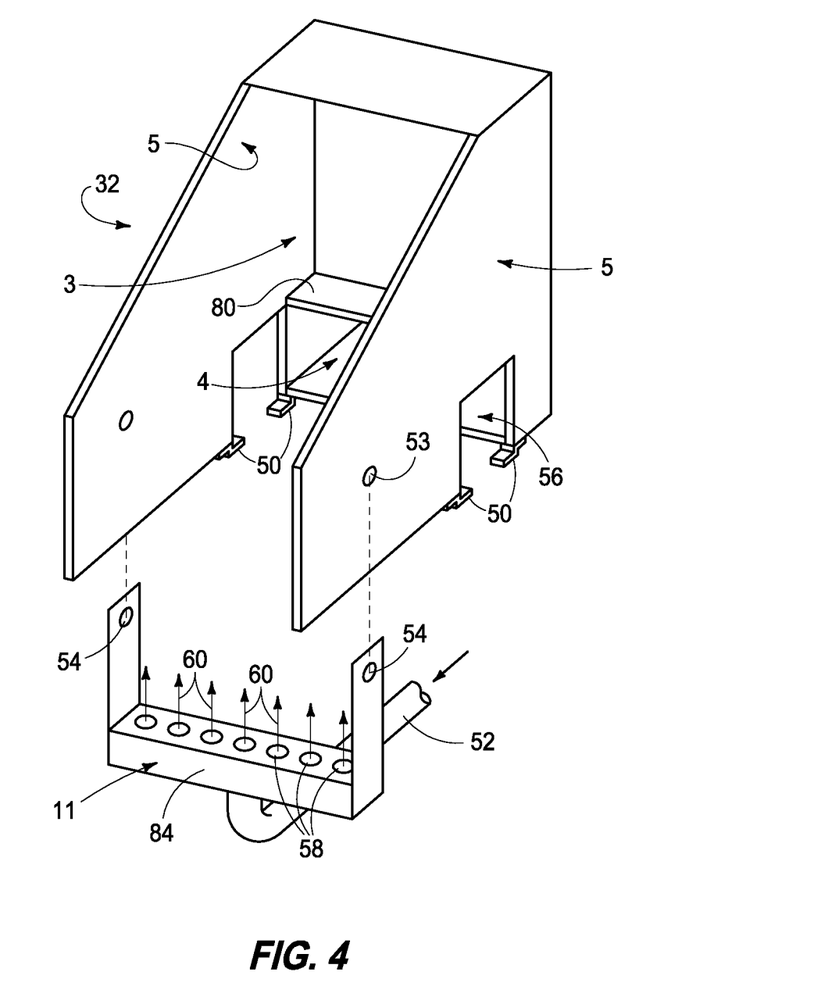
FIG. 4 is a perspective view of a portion of the front section of the end effector of FIG. 1.
Figure 5:
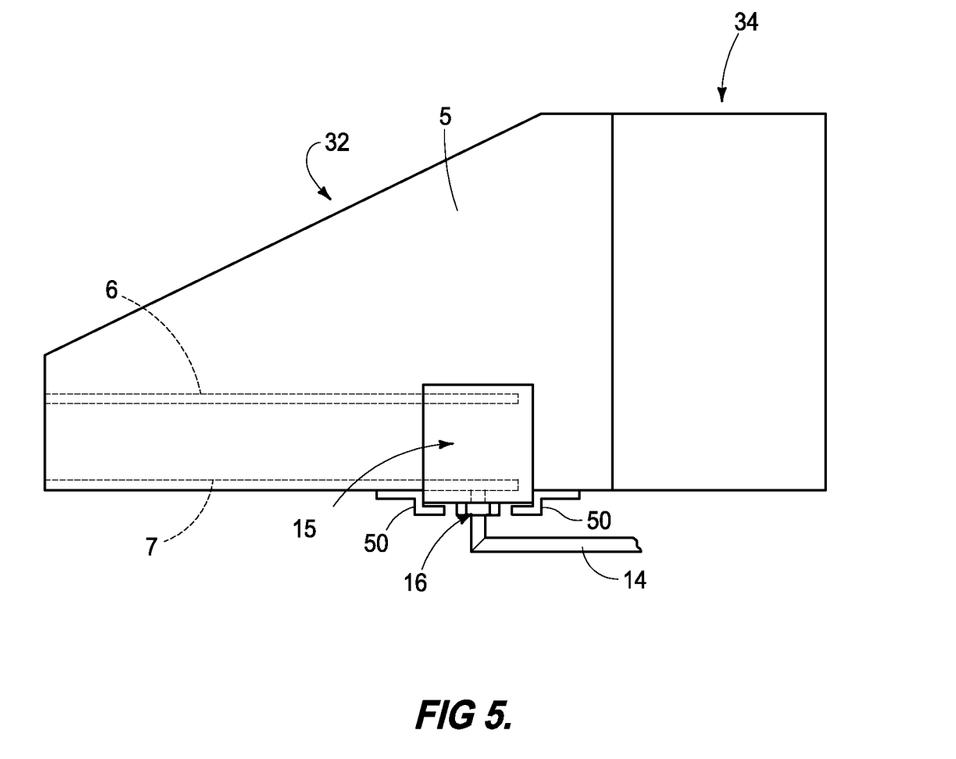
FIG. 5 is a side view of the front section of the end effector of FIG. 1.

Referring to FIGS. 4 and 5, side walls 5 of front section 32 define openings 56 to receive cartridge 15. A pair of fastener devices 50 is associated with each opening 56 and are pivotably secured to bottom edges of side walls 5 at bottom corners in the side walls 5 at the openings 56. The fastener devices 50 have the capability of at least 90 degrees of pivoting rotation. This pivoting action allows for the fastener devices 50 to pivot out of the region of the openings 56 to avoid impeding placement of cartridge 15 into the openings 56. Once the cartridge 15 is in the openings 56 of the front section 32, the fastener devices 50 are pivoted to secure the cartridge 15 in the openings 56 of the front section 32.

Referring to FIG. 4, the portion of divider surface 80 in the front section 32 is shown and establishes a portion of the chamber 4 configured generally as a rectangle. It should be understood that once cartridge 15 is in place in the front section 32, the cartridge 15 establishes or defines a rectangular opening that is aligned with the rectangular opening defined by the divider surface 80 and thereby further extends the chamber 4. An exemplary manifold 11 is illustrated with attachment 54 to be secured at point 53 of the side walls 5. Exemplary attachment figurations include a welding, a cementing, bolt and nut combination, etc. The manifold 11 includes support arms (with attachment 54) that extend from a plenum 84 having fluid openings 58 to release a fluid 60.

Figure 6A:
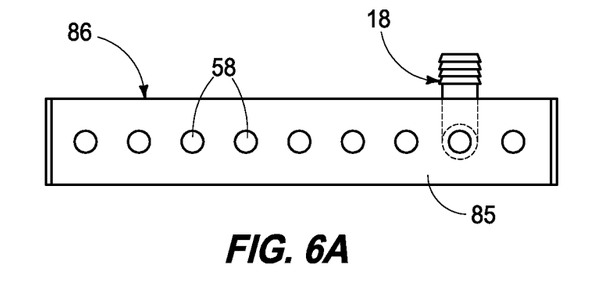
FIG. 6A is a top view of an exemplary manifold of the end effector of FIG. 1.
Figure 6B:
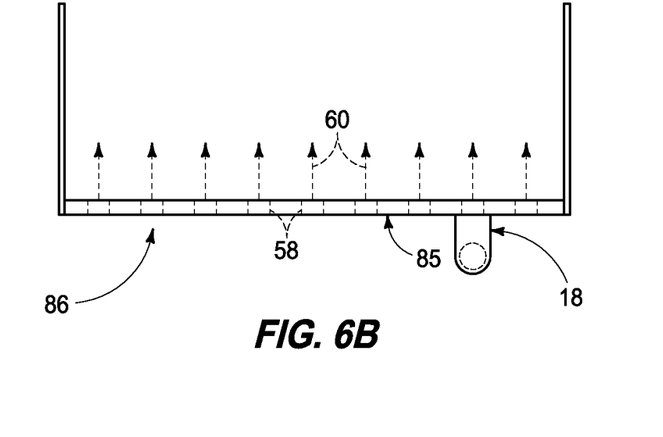
FIG. 6B is a front view of the manifold of FIG. 6A.
Figure 6C:
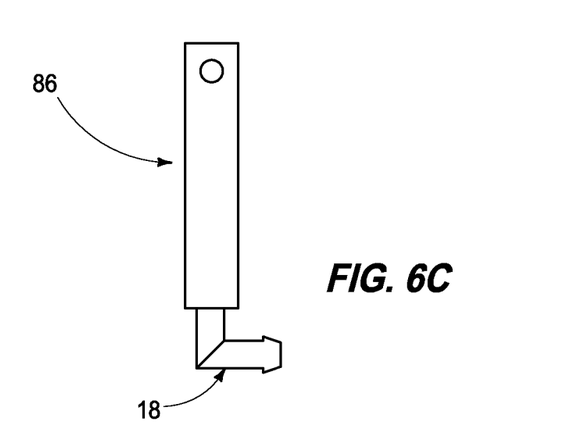
FIG. 6C is a side view of the manifold of FIG. 6A.
Figure 7:
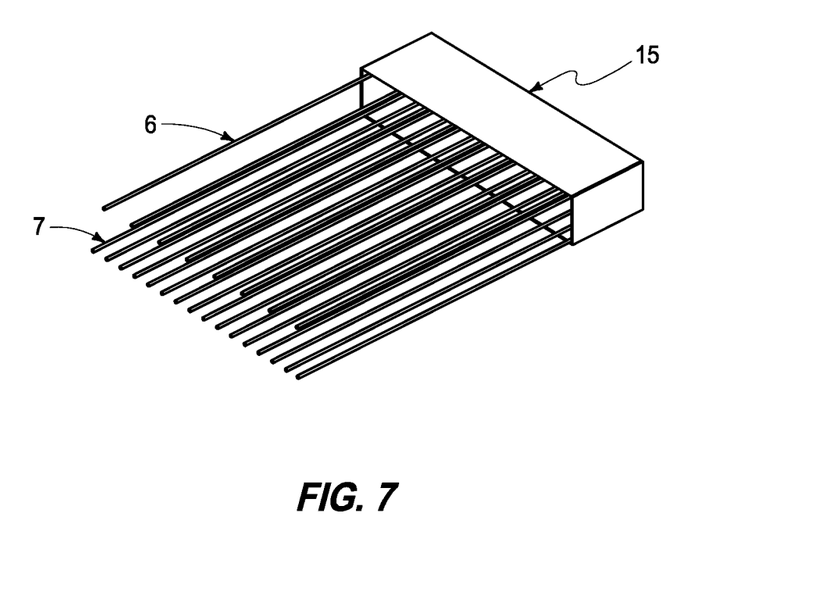
FIG. 7 is perspective view of an exemplary tang cartridge for the end effector of FIG. 1 according to an embodiment of the invention.
Figure 8:
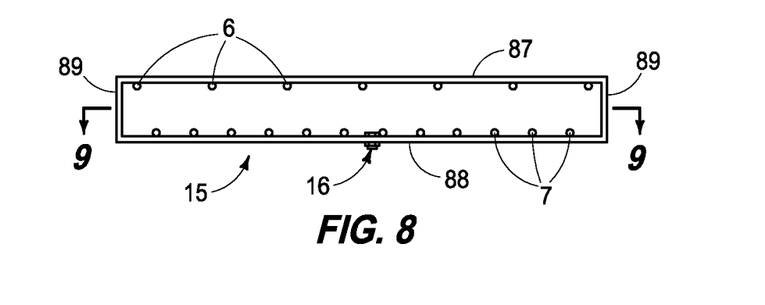
FIG. 8 is a front view of the tang cartridge of FIG. 7.
Figure 9:
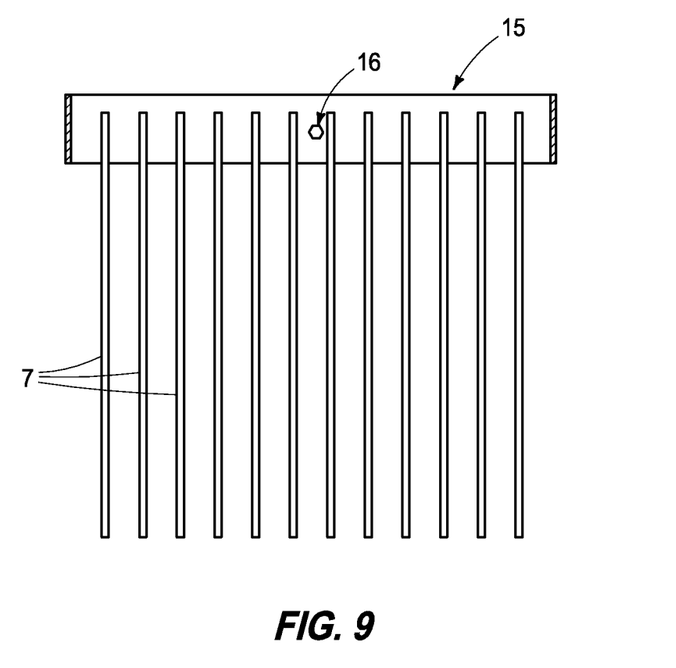
FIG. 9 is a cross-sectional view of the tang cartridge shown in FIG. 8.
Figure 10:
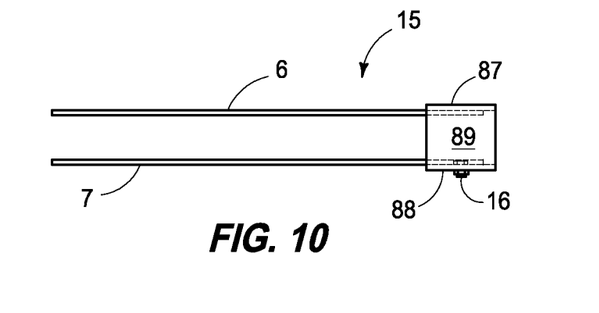
FIG. 10 is a side view of the tang cartridge of FIG. 7.

Referring to FIGS. 6A, 6B and 6C, a different embodiment of an exemplary manifold 86 is illustrated and has a plenum 85 that has a smaller volume capacity relative to the plenum 84 of the FIG. 4 embodiment. This manifold 86 has a fluid nipple 18 instead of the conduit 52 in the FIG. 4 embodiment. A fluid conduit (not shown) is fitted over the fluid nipple 18.

Referring to FIGS. 7-10, an embodiment of cartridge 15 is illustrated. Cartridge 15 has an upper wall 87, a lower wall 88 and a pair of side walls 89 connecting the upper and lower walls 87 and 88 in a spaced relationship. The cartridge 15 has no front wall nor a rear wall, and therefore, defines an opening extending entirely through the structure (as suggested previously). An exemplary coupler 16 through the lower wall 88 is a securement pin 16 which secures the cartridge 15 to the oscillating arm 14 discussed previously (see FIGS. 2 and 5). A plurality of tangs 6 are secured to a lower surface of the upper wall 87. A plurality of tangs 7 are secured to an upper surface of the lower wall 88. The lateral (horizontal in this view) spacing between respective tangs 7 is less than the lateral spacing between respective tangs 6.

Accordingly, for a given width of a cartridge 15, there are more tangs 7 in the cartridge 15 than tangs 6. It should be understood that the larger spacing between tangs 6 allow for smaller dimensioned berries to pass through, or between, the respective tangs 6 to be caught or received by tangs 7. Accordingly, tangs 6 will catch or receive the larger dimensioned berries.

Still referring to FIGS. 7-10, each of the tangs 6 and 7 have a circular cross section and the diameters of tangs 6 or substantially equal to the diameter of tangs 7. Having the same diameters will allow both sets of tangs 6 and 7 to oscillate or vibrate at substantially the same frequency. An exemplary range of oscillation or vibration is 900 to 2,000 hertz. In one embodiment of the invention, the ends of tangs 6 and 7 on the cartridge 15 are aligned. In one embodiment of the invention, each tang 6 and 7 has the same length, and therefore, ends of the tangs 6 and 7 opposite the cartridge 15 are aligned.

It should be understood that different structural configurations for tangs 6 and 7 are contemplated and different securement configurations to a cartridge 15 are contemplated. For example, one set of tangs 6 and 7 could have a different diameter from the other set of tangs. One set of tangs 6 and 7 could have a different cross section configuration relative to the other set of tangs (for example one cross section is round while the other is square). One or more of tangs 6 could have a different diameter. One or more of tangs 7 could have a different diameter. One or more of the tangs 6 could have a different cross section configuration including any polygon configuration (simple convex or concave, cyclic, equilateral, regular convex, star equiangular, etc.) such as a square, rectangle, hexagon, oval, oblong, etc. One or more of the tangs 7 could have a different cross section configuration including any polygon configuration (simple convex or concave, cyclic, equilateral, regular convex, star equiangular, etc.) such as a square, rectangle, hexagon, oval, oblong, etc. One or more of the tangs 6 could be made from different materials relative to the other tangs 6. One or more of the tangs 7 could be made from different materials relative to the other tangs 7.

Tangs 7 could be spaced apart on cartridge 15 at a greater distance than the spacing of tangs 6. The spacing between tangs 6 and 7 could be the same with one set of tangs being aligned or oriented directly over the other set of tangs when viewed from the top. The spacing between tangs 6 and 7 could be the same with one set of tangs being misaligned (not aligned) or staggered over the other set of tangs when viewed from the top. One or more of tangs 6 could be a different length dimension. One or more of tangs 7 could be a different length dimension. The end of one or more of tangs 6 on cartridge 15 could be out of alignment with the other ends of one or more of the other tangs 6. The end of one or more of tangs 7 on cartridge 15 could be out of alignment with the other ends of one or more of the other tangs 7. One or more of tangs 6 could be on an upper surface of the upper wall 87 of the cartridge 15. One or more of tangs 7 could be on a lower surface of the lower wall 88 of the cartridge 15. One or more of the tangs could be on one or both of the side walls 89 of the cartridge 15. One or more of the tangs could be on an inner surface of one or more of the side walls 89 of the cartridge 15. One or more of the tangs could be on an outer surface of one or more of the side walls 89 of the cartridge 15.

It should be understood that different structural configurations for cartridge 15 are contemplated. The cartridge 15 could be a planar structure (instead of the three-dimensional rectangular structure) having one or more tangs on an upper surface or on a lower surface. The cartridge 15 could be a circular configuration. The cartridge 15 can have at least one, or both, of the upper and lower surfaces configured as a convex. The cartridge 15 can have at least one, or both, of the upper and lower surfaces configured as a concave. It should be understood that the tangs 6 and 7 can be secured to the cartridge 15 by various methods, for example, welding or brazing.

Figure 11:
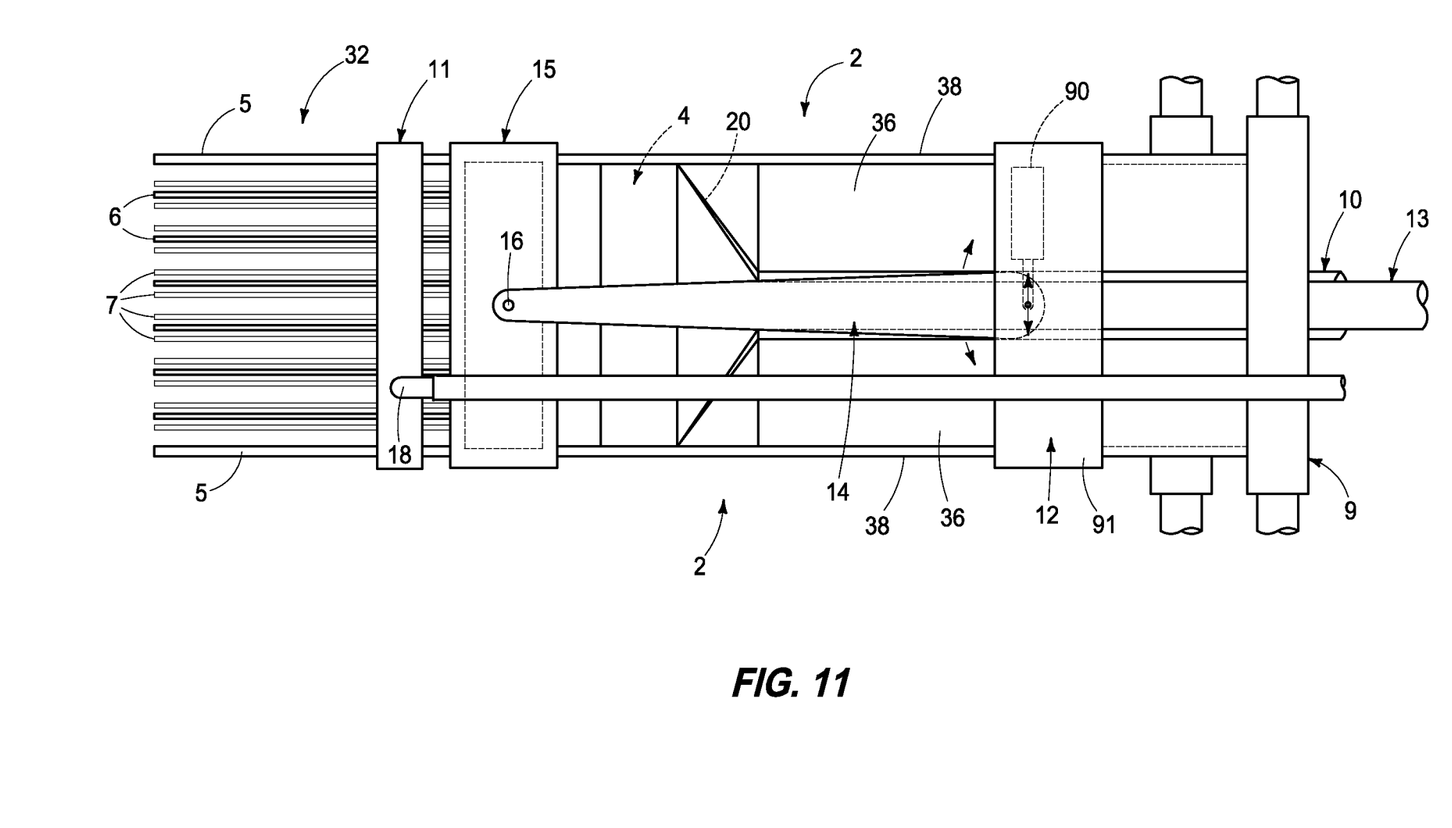
FIG. 11 is a bottom view of the end effector of FIG. 1.

Referring to FIG. 11, a bottom view of the end effector 1 is illustrated. Rear section 2 is basically open so you can see the bottom of top surface 36 and the lower funnel structure 20 is exposed. Moreover, tangs 6 and 7 in the front section 32 can be seen between side walls 5. Oscillator 12 extends across side walls 38 and can be supported upon side walls 38 or supported upon a floor structure not seen in this view wherein the floor structure is supported upon the side walls 38. One exemplary embodiment of the oscillator 12 has a housing 91 enclosing an oscillating device 90. The oscillating device 90 is shown secured to an end of oscillating arm 14.

Still referring to FIG. 11, the oscillating device 90 is capable of moving the end of the oscillating arm 14 in a reciprocal motion, that is, a back and forth motion. This reciprocal motion by the oscillating device 90 moves the entire structure of the oscillating arm 14 in a reciprocal motion and moves the end of the of oscillating arm 14 secured to the cartridge 15 by coupling 16 in a reciprocal motion. Logically, this reciprocal movement at the coupling 16 moves the cartridge 15 in the reciprocal motion and results, ultimately, in vibrating the tangs 6 and 7 at a preselected frequency.

Figure 12:
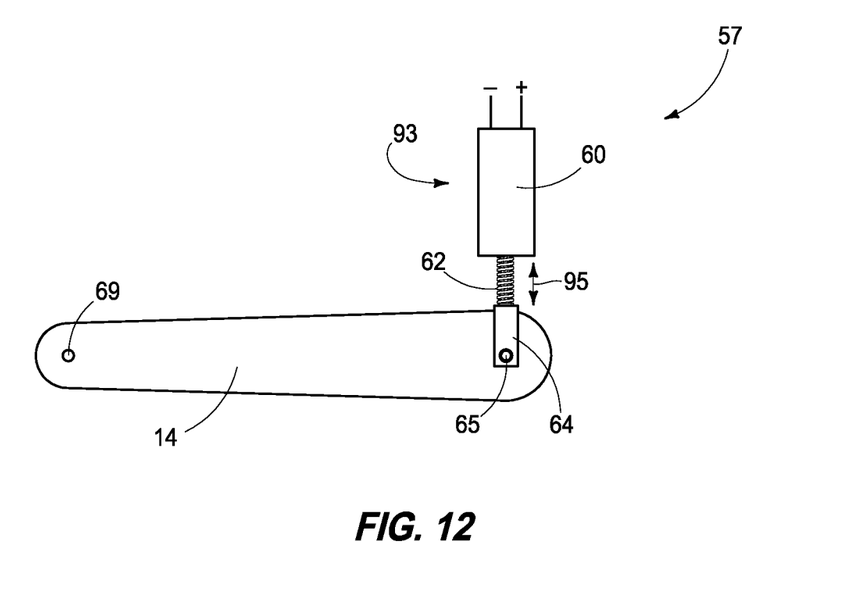
FIG. 12 is a top view of an exemplary oscillator for the end effector of FIG. 1 according to one embodiment of the invention.

Referring to FIG. 12, one exemplary embodiment of an oscillator device 57 is disclosed and illustrated coupled to oscillating arm 14. The exemplary embodiment of the oscillator device 57 is a solenoid 93. The solenoid 93 has a body 60 and a drive shaft 62 that extends from an end of the body 60. An end of the drive shaft 62 is secured to a coupling link 64 with a pin 65 that pivotably secures the drive shaft 62 to an end of the oscillating arm 14. A spring (not referenced with a number) is secured over the drive shaft 62 and applies a pressure force (either a pulling force or a pushing force) between the body 60 and the coupling link 64. The solenoid 93 is capable of driving the drive shaft 62 in at least one direction of a reciprocal motion or direction 95. The solenoid 93 houses a coil that is not shown except for positive and negative terminals exposed at one end of the body 60.

Still referring to FIG. 12, an end of oscillating arm 14 opposite the solenoid 93 includes an opening 69 to receive the coupler 16 (not shown here) that secures the oscillating arm 14 to the cartridge 15 (previously disclosed in FIGS. 2 and 11). When current is applied to the terminals (and therefore, to the coil inside the body 60 of the solenoid 93), the drive shaft 62 will move in one of the two reciprocal directions 95 and the spring will move the drive shaft 62 in the other of the two reciprocal directions 95. In another embodiment of the solenoid 93, current will drive the drive shaft 62 in both directions 95 of the reciprocal motion. The drive shaft 62 drives the oscillating arm 14 in the reciprocal directions 95 (oscillation) and ultimately moves the cartridge 15 and tangs 6 and 7 in the reciprocal directions 95 (oscillation). Accordingly, the tangs 6 and 7 vibrate or oscillate at a selected frequency.

Figure 13:
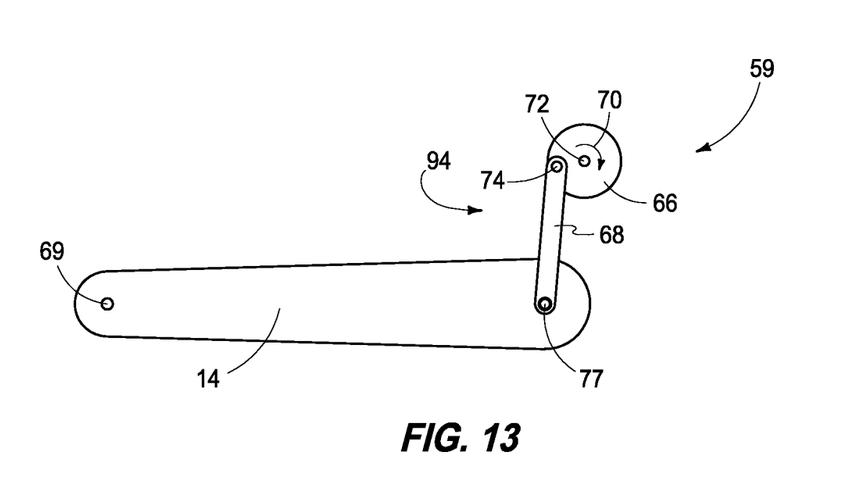
FIG. 13 is a top view of an exemplary oscillator for the end effector of FIG. 1 according to another embodiment of the invention.

Referring to FIG. 13, another exemplary embodiment of an oscillator device 59 is disclosed and illustrated coupled to oscillating arm 14. The exemplary embodiment of the oscillator device 59 is a crank 94 configured to convert rotating motion into reciprocating motion. Rotating motion is provided to an axle 72 by a motor (not shown here). A flywheel or disk 66 is secured to the axle 72. One end of a connecting rod 68 is pivotably secured to an outer periphery of the flywheel 66 at a pivot pin 74. An opposite end of the connecting rod 68 is pivotably secured to the oscillating arm 14 at a pivot pin 77. When current is applied to the motor, the axle 72 and flywheel 66 are rotated 70 thereby rotating the one end of the connecting rod 68 with pivot pin 74. The other end of the connecting rod 68 with pivot pin 77 will move in a reciprocating motion to move the oscillating arm 14 in alternating opposite directions (oscillation).

Still referring to FIG. 13, an end of oscillating arm 14 opposite the crank 94 includes an opening 69 to receive the coupler 16 (not shown here) that secures the oscillating arm 14 to the cartridge 15 (previously disclosed in FIGS. 2 and 11). When current is applied to the motor, the connecting rod 68 will move in a reciprocal motion. The connecting rod 68 drives the oscillating arm 14 in the reciprocal directions 95 (oscillation) and ultimately moves the cartridge 15 and tangs 6 and 7 in the reciprocal directions (oscillation). Accordingly, the tangs 6 and 7 vibrate or oscillate at a selected frequency.

It should be understood that one or more of the components of the end effector 1 can be fabricated from one or more of the following materials/composites: sheet metal, aluminum sheet, injection molded plastic, and ridge material such as steel, aluminum, or bronze.

Method of Use

Referring to FIGS. 1-13, an exemplary method for using the end effector 1 is described according to one embodiment of the invention. The pivot pins 22 secure the end effector 1 to an arm of a harvesting machine. The harvesting machine is provided in a fruit patch such as a blueberry patch.

The exemplary method for using the end effector 1 further includes activating the oscillator 12 which vibrates the oscillating arm 14 to ultimately vibrate the cartridge 15 and tangs 6 and 7. The tangs 6 and 7 are preselected to oscillate at a frequency selected to remove the fruit or berries from the stem. Accordingly, different berries may require different frequencies of vibration by tangs 6 and 7 to remove the berries from their stems. The frequency of oscillation can be adjusted by oscillator 12 to provide the desired frequency of oscillation for tangs 6 and 7 and ultimately the berries to be collected.

Still referring to the exemplary method for using the end effector 1, as tangs 6 and 7 are oscillating and end effector 1 is moving through the cluster of berries, air 60 is driven from the fluid source (air source) through the fluid openings 58 of manifold 11. The air moves through and between the side walls 5 of the front section 32 and forces leaves and debris away from the berries to expose the berries to the tangs 6 and 7 (the driven air also prevents the leaves and debris from blocking (clogging) the upper and lower funnel structures 21 and 20 and the first and second conduits 10 and 13). The camera 8 originally locates the cluster of berries and continues to provide information during the movement of the end effector 1 through the cluster.

Still referring to the exemplary method for using the end effector 1, as the tangs 6 and 7 move through the cluster, the smaller dimensioned berries pass between tangs 6 to encounter the vibrating tangs 7. The vibrating tangs 7 impart a vibration to the stems and/or berries to release the smaller berries from their stem. Once released, the berries encounter the vacuum provided through the lower funnel structure 20 and through the second conduit 13 to be pulled through the lower funnel structure 20 and through the second conduit 13 and ultimately received in the harvesting machine. Similarly, the larger dimensioned berries encounter the vibrating tangs 6 which impart a vibration to the stems and/or berries to release the larger berries from their stem. Once released, the larger berries encounter the vacuum provided through the upper funnel structure 21 and through the first conduit 10 to be pulled through the upper funnel structure 21 and through the first conduit 10 and ultimately received in the harvesting machine.

The berries are received in the harvesting machine in the highest degree of quality. The energy in the vibrating tangs 6 and 7 is minimal, and therefore, the energy transferred to the stems and/or berries is minimal allowing for the berries to be released from the stem without imparting an amount of energy that damages or decrease the quality of the berries. Additionally, since the tangs 6 and 7 are spaced differently, berries having different dimensions are separated by end effector 1 and can be received into different compartments of the harvesting machine.

For all the end effectors disclosed in this document, and all parts, sections and components discussed herein, the following is information that is applicable. In exemplary embodiments, the range of spacing distances between the tangs can be selectively modified or changed with the removal and replacement of the tang cartridge. For the top row of tangs, in one exemplary embodiment, may be based on the desired size of the large blue berries being harvested. The cut between Large and Medium blue berries is usually between ¾ inch to ½ inch and the tangs can be changed out based on the size the customer desires. For the bottom row of tangs, in one exemplary embodiment, the range of spacing distances between the tangs may be based on the smallest diameter of blue berries that is desired to be removed from the cluster and allowing small immature berries to go through the tangs. The diameter of the berries can vary based on the variety of blueberry but will range from ⅛ inch to ¼ inch.

For all the end effectors disclosed in this document, and all parts, sections and components discussed herein, the following is information that is applicable. The diameter of the tangs is determined, in one exemplary embodiment, by the natural frequency that best dislodges the variety of berry. In one exemplary method step, once the frequency is determined for removing the berry, the selection of material, the material stiffness, and the diameter of each tang is selected to get the desired frequency. An exemplary range of diameter sizes will vary between 0.075 inch to 0.225 inch to obtain the desired frequency of vibration of the tangs to range between 600 cycles per second to 3000 cycles per second.

For all the end effectors disclosed in this document, and all parts, sections and components discussed herein, the following is information that is applicable. In exemplary embodiments, the number of tangs is determined by the desired width of the end effector and the spacing and diameter of the tangs to fill the width of the end effecter. This can range from, in one exemplary embodiment, 4 inches to 18 inches depending on the variety of berries to be picked.

For all the end effectors disclosed in this document, and all parts, sections and components discussed herein, the following is information that is applicable. An exemplary range of various materials for the housing of an exemplary end effector include polymers, plastics, plastic injection mold materials, fiberglass, metals, stainless steel, sheet metal, spring steel, aluminum, bronze, copper, reinforced tin, manganese, nickel, zinc, non-metals or metalloids, and polyethylene, or any combination of these various materials.

For all the end effectors disclosed in this document, and all parts, sections and components discussed herein, the following is information that is applicable. An exemplary overall length dimension for the housing of an exemplary end effector is 20 inches with a range of overall length dimensions being 10 inches to 40 inches. An exemplary overall width dimension for the housing of an exemplary end effector is 8 inches with a range of overall width dimensions being 5 inches to 28 inches. An exemplary overall depth dimension for the housing of an exemplary end effector is 8 inches with a range of overall depth dimensions being 5 inches to 28 inches.

For all the end effectors disclosed in this document, and all parts, sections and components discussed herein, the following is information that is applicable. An exemplary number of cameras on the housing of an exemplary end effector include at least one for each side of the housing which may total four. That is, one camera for each side of the rectangularly configured housing. For another exemplary embodiment, 2 or more cameras can be provided on at least one, and any total of, sides of the housing. An exemplary type of camera is a high-definition digital color camera.

For all the end effectors disclosed in this document, and all parts, sections and components discussed herein, the following is information that is applicable. An exemplary range of materials for tangs of an exemplary end effector include polymers, plastics, plastic injection mold materials, fiberglass, metals, stainless steel, spring steel, sheet metal, aluminum, bronze, copper, reinforced tin, manganese, nickel, zinc, non-metals or metalloids, and polyethylene, or any combination of these various materials. An exemplary configuration for an exemplary tang includes a metal core structure with a coating over the metal core such as a plastic. An exemplary metal core includes any metal, stainless steel, spring steel, sheet metal, aluminum, bronze, copper, reinforced tin, manganese, nickel, zinc and metalloids, or any combination of these various materials. An exemplary coating material over the metal core further includes any polymer, plastic injection mold materials, fiberglass, non-metals or metalloids, and polyethylene, or any combination of these various materials.

For all the end effectors disclosed in this document, and all parts, sections and components discussed herein, the following is information that is applicable. An exemplary range of materials for a tang cartridge of an exemplary end effector include polymers, plastics, plastic injection mold materials, fiberglass, metals, stainless steel, sheet metal, spring steel, aluminum, bronze, copper, reinforced tin, manganese, nickel, zinc, non-metals or metalloids, and polyethylene, or any combination of these various materials.

For all the end effectors disclosed in this document, and all parts, sections and components discussed herein, the following is information that is applicable. An exemplary range of pressures for a manifold of an exemplary end effector include 3 inches Hg (inHg) to 10 inHg with one specific embodiment being 6 inHg. An exemplary range of gases for an exemplary manifold include inert gases, air, nitrogen, oxygen ($O_2$), nitrogen ($N_2$), helium, argon, carbon dioxide ($CO_2$), acetylene ($C_2H_2$), propane ($C_3H_8$), butane ($C_4H_{10}$) nitrous oxide ($N_2O$) and freon (various chlorofluorocarbons).

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect.

What is claimed is:

1. An end effector for harvesting fruit, the end effector comprising:
    a housing;
    a plurality of tangs extending from an end of the housing; and
    an oscillator device secured to the housing and in an oscillating relationship with the plurality of tangs;
    wherein the plurality of the tangs comprises a first set of tangs laterally spaced in a first plane;
    a second set of tangs laterally spaced in a second plane different from the first plane; and
    wherein the first set of tangs each comprise a first diameter, and wherein the second set of tangs each comprise a second diameter different from the first diameter.

2. The end effector of claim 1 wherein the first plane is spaced in a parallel relationship with the second plane.

3. The end effector of claim 1 wherein the first set of tangs comprise a first spacing distance between respective tangs and wherein the second set of tangs comprise a second spacing distance between respective tangs, the first spacing distance different from the second spacing distance.

4. The end effector of claim 1 further comprising a collection device in the housing and proximate a rear end of the first set of tangs.

5. The end effector of claim 1 wherein the first set of tangs comprises a first number of tangs, and wherein the second set of tangs comprises a second number of tangs different from the first number of tangs.

6. The end effector of claim 1 further comprising a manifold secured to the housing and having openings positioned to direct a fluid toward the plurality of tangs.

7. The end effector of claim 1 wherein the plurality of tangs is secured to a cartridge, the cartridge being selectively removable from, and attachable to, the housing.

8. The end effector of claim 1 wherein the oscillator device comprises one of the following apparatuses:
    a solenoid; and
    a crank.

9. An end effector for harvesting fruit, the end effector comprising:
    a housing;
    a plurality of tangs extending from an end of the housing; and
    an oscillator device secured to the housing and in an oscillating relationship with the plurality of tangs;
    wherein the plurality of the tangs comprises a first set of tangs laterally spaced in a first plane;
    a second set of tangs laterally spaced in a second plane different from the first plane; and
    wherein the first set of tangs comprise a first spacing distance between respective tangs and wherein the second set of tangs comprise a second spacing distance between respective tangs, the first spacing distance different from the second spacing distance.

10. The end effector of claim 9 wherein the first plane is spaced in a parallel relationship with the second plane.

11. The end effector of claim 9 further comprising a collection device in the housing and proximate a rear end of the first set of tangs.

12. The end effector of claim 9 wherein the first set of tangs comprises a first number of tangs, and wherein the second set of tangs comprises a second number of tangs different from the first number of tangs.

13. The end effector of claim 9 further comprising a manifold secured to the housing and having openings positioned to direct a fluid toward the plurality of tangs.

14. The end effector of claim 9 wherein the plurality of tangs is secured to a cartridge, the cartridge being selectively removable from, and attachable to, the housing.

15. The end effector of claim 9 wherein the oscillator device comprises one of the following apparatuses:
a solenoid; and
a crank.

16. The end effector of claim 9 wherein the first and second set of tangs comprise diameters that are the same.

* * * * *

UNITED STATES PATENT AND TRADEMARK OFFICE
CERTIFICATE OF CORRECTION

PATENT NO. : 10,674,666 B2  
APPLICATION NO. : 15/982512  
DATED : June 9, 2020  
INVENTOR(S) : Frances Wilson Moore Page 1 of 1

It is certified that error appears in the above-identified patent and that said Letters Patent is hereby corrected as shown below:

On the Title Page

Item (56) References Cited – Page 2, Column 1, Line 32 Replace – "US-4,532,757 8/1985 Tuue" with --US-4,532,757 8/1985 Tutle--

In the Specification

Column 3, Line 57 – Replace "with the each other" with --with each other--

Column 6, Line 26 – Replace "of the of oscillating" with --of the oscillating--

Signed and Sealed this  
Twenty-sixth Day of October, 2021

Drew Hirshfeld  
*Performing the Functions and Duties of the  
Under Secretary of Commerce for Intellectual Property and  
Director of the United States Patent and Trademark Office*